Feb. 16, 1960
G. A. GARRETT
2,925,594
RADAR SEARCH SCAN SYSTEM
Filed March 18, 1946
2 Sheets-Sheet 1
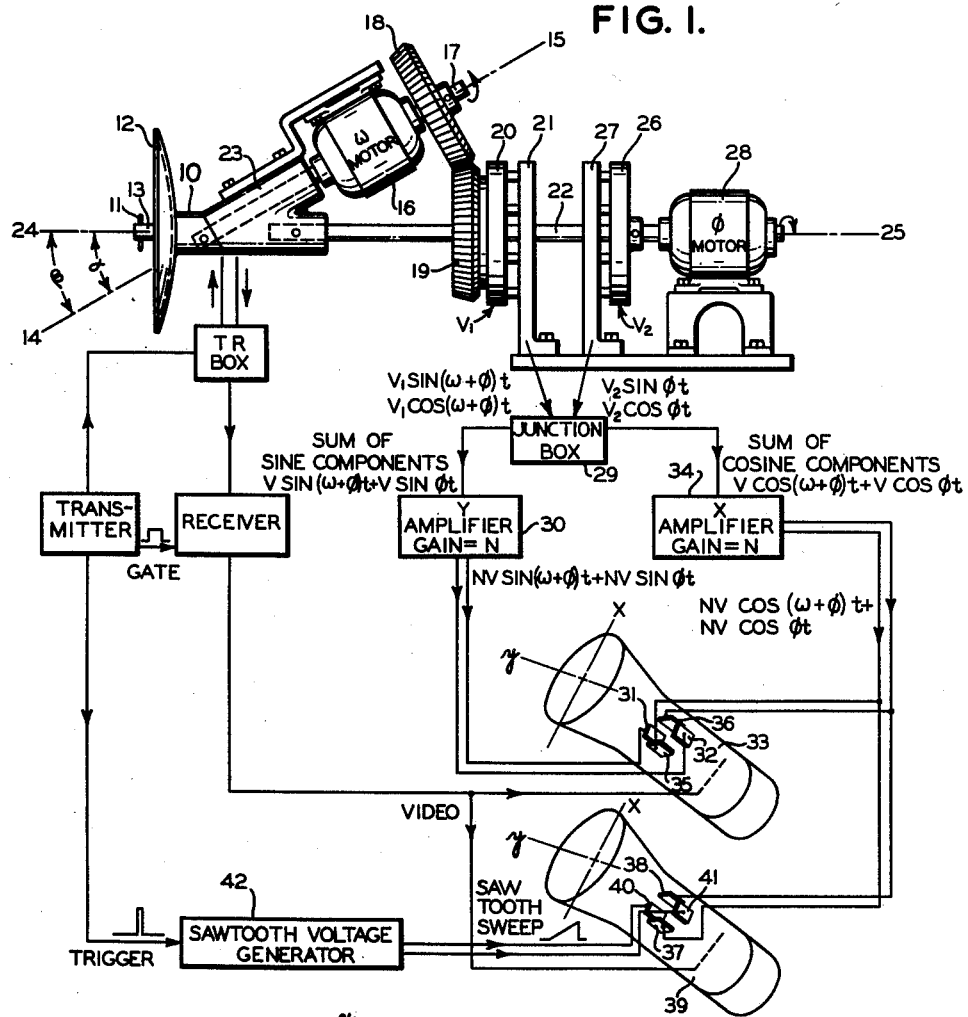
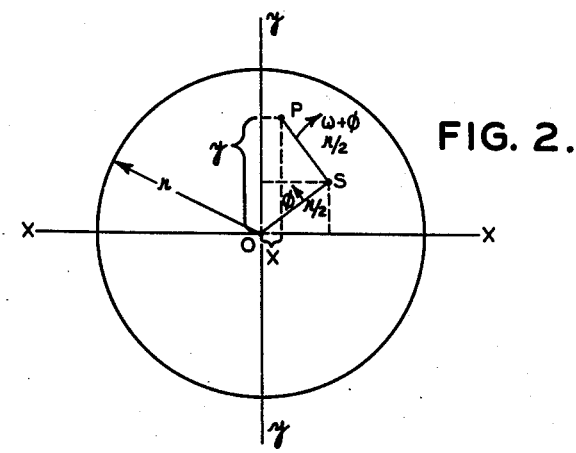
INVENTOR.
GEORGE A. GARRETT
BY *M. O. Hayes*
ATTORNEY Feb. 16, 1960
G. A. GARRETT
2,925,594
RADAR SEARCH SCAN SYSTEM
Filed March 18, 1946
2 Sheets-Sheet 2
FIG. I-A
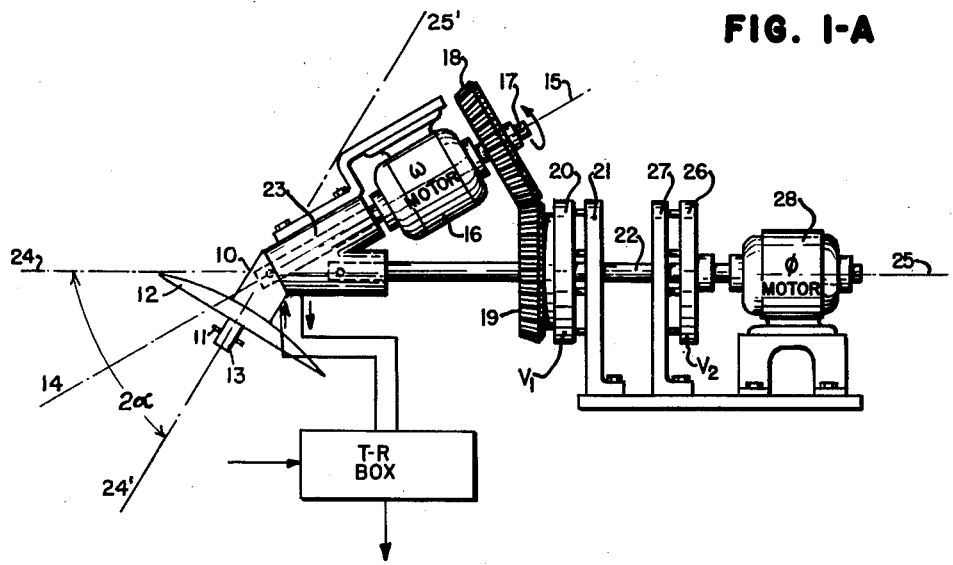
FIG. I-B
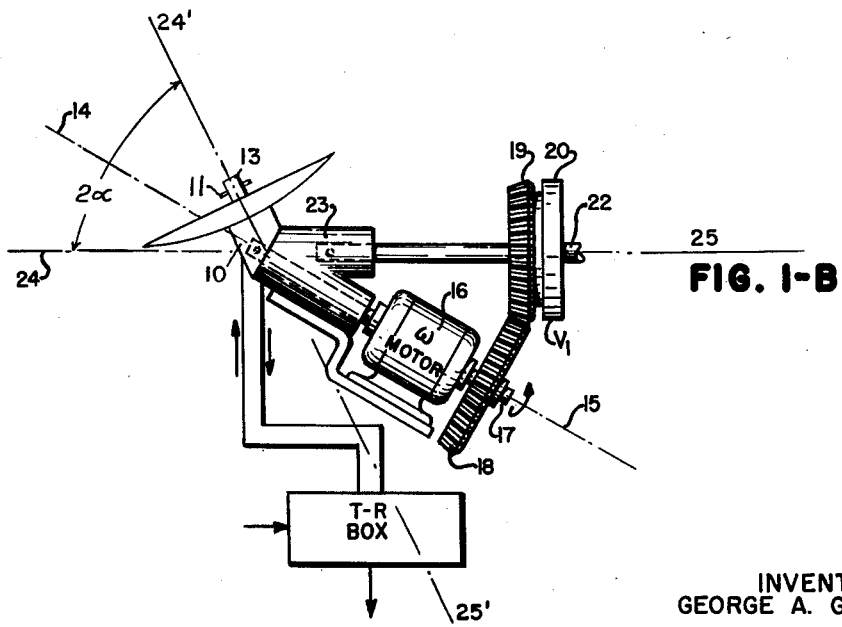
INVENTOR
GEORGE A. GARRETT
BY
ATTORNEY

United States Patent Office 2,925,594
Patented Feb. 16, 1960

2,925,594

RADAR SEARCH SCAN SYSTEM

George A. Garrett, Oak Ridge, Tenn., assignor, by mesne assignments, to the United States of America as represented by the Secretary of the Navy Application March 18, 1946, Serial No. 655,307

13 Claims. (Cl. 343—5)

This invention relates to directive antenna systems for radar and more particularly to a directional antenna system producing a beam scanning a conical shaped area, associated with means for remotely indicating the relative direction of said beam with respect to a central axis at any instant of time.

It is desirable to have the beam from a radar antenna cover as small a solid angle as possible in order to secure better resolution of targets. This requirement makes it necessary to move, or scan, the beam throughout the area to be searched. Means also are necessary to correlate target indications with the direction in which the beam is pointed. For certain radar installations, notably in aircraft, provision need only be made to search a segment of space rather than searching in all possible directions, since in the case of aircraft interest centers mainly on a search of the immediate area toward which the ship is flying. A method which has been developed to accomplish this result is known as spiral scanning. In this method the antenna beam is moved in an expanding spiral from its original axial position until the designed limit of the scanned area is reached, and then it is returned to its original axial position through a contracting spiral path. The design and production of a system based on this method poses a severe mechanical problem in obtaining the close dynamic balance of the moving parts required because of the relatively high rotative speeds involved, and the constant shifting of the center of gravity of several elements comprising the moving system. Another objection to the spiral type of conical scan is the extremely large ratio of the rate of scan of an area near the edge of the field to the rate of scan of an area near the center of the field.

The general object of the present invention is to provide a novel method for producing a conical scan which will minimize the mechanical problems involved in the manufacture of a suitable antenna system for producing the scan.

Another object of the present invention is to provide means associated with the conical scan antenna system responsive to its motion which will correlate instantaneously the relative direction of the antenna beam, with respect to a central axis, upon a remote indicator.

Still another object of the present invention is to provide a novel conical scan antenna system which will provide a minimum difference in scanning rates throughout the area scanned.

These and other objects will be apparent from the following specification when taken with the accompanying drawings, in which:

Fig. 1 is a schematic representation of one embodiment of the invention as applied to an airborne search radar. Fig. 1–A and Fig. 1–B represent changes in position of rotating elements of Fig. 1.

Fig. 2 is a diagrammatic representation of a cathode ray tube showing the mathematical relationship representing the motion of a spot upon the face of the tube.

Referring to Fig. 1, an antenna dipole 11 is fixed in position at the axial focus of a parabolic reflector 12 by means of an antenna feed 13 which may be either a coaxial line or a wave guide. The reflector 12 is secured to a cylindrical member which is rotatably mounted about an axis 14—15 which lies at an angle $\alpha$ to the axis of generation of said reflector 12. Rotation about axis 14—15 is at a rate $\omega$ in a clockwise direction as viewed from end 15 of axis 14—15, and is accomplished by a motor 16 through a drive shaft 17 which is rotatably mounted in a bearing yoke 23 and is keyed to reflector 12. A bevel gear 18 is fixedly mounted on drive shaft 17 and meshes with a bevel gear 19 which is rigidly affixed to windings 20 of a potentiometer whose stationary brushes 21 bear against and make contact with said windings 20 for obtaining voltages varying sinusoidally with angular shaft rotation. Bevel gear 18 has a ratio to bevel gear 19 of 1:1. Bevel gear 19 and the "sinusoidal" potentiometer consisting of windings 20 and brushes 21 are rotatably mounted on a drive shaft 22 to permit relative motion between the potentiometer and the shaft. Dynamic balance about axis 14—15 must be quite close since the rate of revolution of shaft 17 is relatively high. However, as none of the members revolving about axis 14—15 have their center of gravity shifted about during operation, this close balance is more easily attainable.

Drive shaft 22 is rigidly affixed to the bearing yoke 23 in which drive shaft 17 revolves so that the axis 24—25 of shaft 22 intersects axis 14—15 at an angle $\beta$. Angle $\beta$ is made equal to angle $\alpha$ so that complete scanning of an area is accomplished without overlapping or voids.

A sinusoidal potentiometer similar to potentiometer 20, 21 whose windings 26 are rigidly affixed to and rotate with shaft 22, and whose brushes 27 are fixedly mounted so that they bear on said windings 26, is incorporated on axis 24—25. Rotation of shaft 22 at a rate $\phi$ about axis 24—25 is accomplished by means of a motor 28. Rotation is counter clockwise when viewed from end 25 of axis 24—25. The rate of rotation $\phi$ is relatively much slower than the rate of rotation $\omega$, so that close dynamic balance about this axis is not essential. With yoke 23 maintained in the position shown in Fig. 1, rotation of reflector 12 about axis 14—15 will cause the beam radiated from dipole 11 to trace a cone in space having an apex angle $2\alpha$, as shown in Fig. 1A, with the position of this cone tangent to and below axis 24—25. By rotating yoke 23 through 180° to the position shown in Fig. 1B, continued rotation of reflector 12 about axis 14—15 will now result in the radiated beam tracing a similar cone in space tangent to and above axis 24—25. It will thus be seen that the combined rotation of yoke 23 and reflector 12 causes the antenna beam to scan a solid cone whose apex angle is $4\alpha$.

The mechanical operation of the device may easily be understood from the following description. Rotation of shaft 22 drives windings 26 and causes rotation of bearing yoke 23. Since shaft 22 is secured to bearing yoke 23, the yoke will necessarily rotate about the axis of shaft 22 in response to rotation of that shaft, driving shaft 17 about the axis of rotation of shaft 22 causing a nutation of reflector 12, the amount of nutation varying from zero to $2\beta$. Since shaft 22 extends through potentiometer winding 20, gear 19 and brush 21 with a slidable fit, no relative rotation occurs between gears 18 and 19 as shaft 17 and yoke 23 are rotated around shaft 22. Rotation of shaft 17 on the other hand causes relative movement between gears 18 and 19 and also causes rotation of reflector 12. Rotation of shaft 17 will, therefore, cause reflector 12 to scan a hollow conical cone the width of which is represented by $2\alpha$. Simultaneous rotation of shafts 17 and 22 therefore cause reflector 12 to scan a solid cone of included angle $4\alpha$, the scanning action being composed of a series of conical scans of small width $2\alpha$, the center of each individual conical scan being offset from the axis 24—25 by an amount $\beta$, and being rotated about the axis 24—25 in a circular manner at a rate $\phi$. It will readily be understood that the rate of each individual scan may be represented by $\omega$, and the rate of scan of the solid cone, made up of the individual conical scans, may be represented by $\phi$. The rate of scan of sample areas throughout the solid cone varies from the algebraic sum $\omega+\phi$ at the center to $\omega-\phi$ at the periphery, the average rate of scan being, therefore, represented by $\omega$.

It is to be understood that transfer of energy between the antenna 11 and the radar transmitter-receiver unit may be secured through the use of any of the various rotating joints known to those skilled in the art, and electrical connection to the rotatably mounted elements may be secured through the use of brushes bearing upon suitably mounted slip rings.

The windings 20 and 26 of the sinusoidal potentiometers are energized with voltages of $V_1$ and $V_2$ respectively. The energizing voltages $V_1$ and $V_2$ are supplied from well regulated sources of constant direct current potential and are adjusted so that they are equal to each other. From the brushes 21 are secured voltages of $V_1 \sin(\omega+\phi)t$ and $V_1 \cos(\omega+\phi)t$; from brushes 27 are secured voltages of $V_2 \sin \phi t$ and $V_2 \cos \phi t$. $V=V_1=V_2$. Under these conditions the output voltages from the brushes 21 and 27 are fed to a junction box 29 where the sin components from each brush are combined and the cosine components from each brush combined. The combined sin components, $V \sin(\omega+\phi)t + V \sin \phi t$, are fed to the input of a Y amplifier 30 which has a gain of N times. The output of Y amplifier 30, $NV \sin(\omega+\phi)t + NV \sin \phi t$, is fed to vertical deflection plates 31 and 32 of a cathode ray tube 33. The combined cosine components, $$V \cos(\omega+\phi)t + V \cos \phi t$$

are fed to the input of an X amplifier 34 which, exactly like Y amplifier 30, has a gain of N times. The output of X amplifier 34, $NV \cos(\omega+\phi)t$, is fed to horizontal deflection plates 35 and 36 of the cathode ray tube 33, and also to the horizontal deflection plates 37 and 38 of a cathde ray tube 39. The vertical plates 40 and 41 of the cathode ray tube 39 are connected to a conventional sawtooth voltage generator 42 which is triggered in synchronism with the radar pulses emanating from the antenna 11.

The information presented on the face of a cathode ray tube 39 is relative bearing and range of the target. The relative bearing is referred to the flight path of the aircraft which is represented by the Y axis of the tube 39. A maximum relative bearing angle of $\pm 2\alpha$ can be presented along the X axis of tube 39. The range of the target is indicated by the distance of the echo spot above the X axis.

The flight path of the aircraft may be represented by a line normal to the face of cathode ray tube 33 intersecting the X and Y axes at the center of said face. Then an imaginary line joining a target indication with the intersection of said X and Y axis at the center of the tube face will reveal the relative direction from 0° to 360° of the target from the flight path of the aircraft in a plane normal to the flight path of the aircraft. The distance out from the intersection of the X and Y axis at the center of the tube face to the target indication along this imaginary line is a measure of the angle between the flight path of the aircraft and the line of sight path to the target from 0° up to a maximum of $2\alpha°$.

The above insertions may be more readily understood by reference to Fig. 2 which shows the mathematical relations existing on the face of cathode ray tube 33.

The tube face is bisected by X and Y axes which cross at the center of the face O. The radius $r$ is from the central intersection of the axes at O to the outer circumference. A target echo is represented by the point P whose coordinates are X and Y. Point P may be represented by means of two revolving vectors OS and SP each of length $r/2$. Vector OS revolves about the central intersection of the axes O at a rate $\phi$ in a counter clockwise direction. Vector SP revolves about the end of vector OS at a rate of $\omega+\phi$ in a clockwise direction. The vector sum will therefore represent the location of P at any time. The X component of vector OS is $r/2 \cos \phi t$ and of vector SP is $r/2 \cos(\omega+\phi)t$. The Y component of vector OS is $r/2 \sin \phi t$ and of vector SP is $$r/2 \sin(\omega+\phi)t$$

Addition of these components gives $$X = r/2 \cos(\omega+\phi)t + r/2 \cos \phi t$$
$$Y = r/2 \sin(\omega+\phi)t + r/2 \sin \phi t$$

These equations are directly proportional to the equations given previously for the outputs of the X amplifier 34 and the Y amplifier 30, so that a proper choice of energizing voltage V and amplifier gain N would make them exactly equal.

It will be noted that $\omega$ and $\phi$ are in opposite directions so as to minimize the difference in rate of scan throughout the search area. The minimum rate of scan occurs at the axes or center; and the maximum rate of scan occurs at the outer circumference. The angular rate at the center is the algebraic sum of $\phi+\omega$ and at the circumference is the algebraic sum of $\phi-\omega$.

It will be understood that there are a great many possible variations in the arrangement of this invention without departing from its basic scope and spirit. It would be practical for small angles $\alpha$ and $\beta$ to mount the antenna 11 off center and then be able to rotate the antenna reflector about its own axis to produce the $\omega$ scan.

By means of suitable gearing it would be possible to obtain both the $\omega$ and the $\phi$ drives from the same motor.

For applications involving relatively fast rates of scan, two phase generators could be used to control the cathode ray beam instead of the sinusoidal potentiometers described.

What is claimed is:

1. Apparatus for producing a radar scanning pattern comprising a parabolic reflector, an antenna fixed at the focal axis thereof, means for rotating said reflector and said antenna about a first axis which makes a predetermined acute angle with said focal axis, and means for simultaneously rotating said reflector and said antenna about a second axis which is at said predetermined acute angle with said first axis.

2. Apparatus for producing a radar scanning pattern comprising a directional antenna having a parabolic reflector and a radiating dipole fixed at the focal axis thereof, means for rotating said directional antenna in a first direction about a first axis which makes a predetermined acute angle with said focal axis, and means for rotating said first axis in a direction opposite said first direction about a second axis which makes an acute angle with said first axis equal to said predetermined angle.

3. Apparatus for producing a radar scanning pattern comprising in combination a parabolic reflector and an antenna fixed at the focal axis thereof, means for rotating said reflector and said intenna as a unit in a circular path about a first axis which makes a predetermined acute angle with the focal axis of said parabolic reflector, and means for simultaneously rotating said first axis in a circular path about a second axis which makes an angle with said first axis equal to said predetermined acute angle whereby electromagnetic energy radiated from said antenna and focused into a beam by said reflector scans a solid cone in space.

4. In an arrangement as defined in claim 3 wherein said reflector and antenna rotate in a first direction and wherein said first axis rotates in an opposite direction with the speeds of rotation being unequal.

5. Apparatus for producing a radar scan pattern comprising a directional antenna having a parabolic reflector and a radiating element fixed at the focal axis thereof, means for rotating said directional antenna about a first axis which makes a predetermined acute angle with respect to the focal axis of said parabolic reflector such that the directional beam radiated from said antenna scans a hollow cone in space with said first axis corresponding to the altitude thereof, and means cooperating with said first means for rotating said first axis about a second axis which makes an angle with said first axis equal to said predetermined acute angle whereby said beam scans a solid cone in space the altitude of which corresponds to said second axis and the apex angle of which is equal to four times said predetermined acute angle.

6. In an arrangement as defined in claim 5 wherein said directional antenna is rotated about said first axis in a first direction at a first speed and wherein said first axis is rotated about said second axis in an opposite direction at a second speed, said first speed being greater than said second speed.

7. Apparatus for producing a radar scanning pattern comprising a directional antenna having a parabolic reflector and a radiating element fixed at the focal axis thereof, means for rotating said directional antenna in a first direction about a first axis which makes an acute angle with said focal axis of said parabolic reflector, and means for rotating said directional antenna in a direction opposite said first direction about a second axis which makes an acute angle with said first axis equal to said predetermined angle, means for generating voltages proportional respectively to the sines and cosines of the angles of rotation of said directional antenna about said first axis and said first axis about said second axis, a cathode ray tube, means for applying said voltages to opposite deflecting elements of said tube whereby the position of the cathode ray beam thereof represents the instantaneous position of said antenna.

8. Apparatus for producing a radar scanning pattern comprising a V-shaped member having first and second branch legs, the longitudinal axes of which are at a predetermined acute angle, said member having its apex truncated by a plane that is normal to the longitudinal axis of said first leg, a cylindrical member, said member having one of its ends inclined at an angle with its longitudinal axis which angle is the complement of said acute angle, a parabolic reflector secured to the other end of said cylindrical member, an antenna located at the focus of said parabolic reflector, means for rotating said cylindrical member while maintaining the inclined end thereof in contact with the truncated portion of said V-shaped member, and means for simultaneously rotating said V-shaped member about the longitudinal axis of said second leg.

9. In an arrangement as described in claim 8 wherein said cylindrical member and said V-shaped member rotate in opposite directions at unequal speeds with the speed of rotation of said cylindrical member being greater than that of said V-shaped member.

10. In an arrangement as described in claim 9 wherein said cylindrical member and said V-shaped member rotate in opposite directions at unequal speeds with the speed of rotation of said cylindrical member greater than that of said V-shaped member, whereby a plurality of hollow conical areas are scanned by said beam during each complete cycle of rotation of said V-shaped member.

11. Apparatus for scanning a predetermined area in space with a directional beam of electromagnetic energy comprising, in combination, a V-shaped member having first and second branch legs the longitudinal axes of which are at a predetermined acute angle, said V-shaped member having its apex truncated by a plane that makes an obtuse angle with the longitudinal axis of said first leg, a cylindrical member, said cylindrical member having one of its ends inclined at an angle with its longitudinal axis which angle is the supplement of said obtuse angle, a parabolic reflector secured to the other end of said cylindrical member with its axis of symmetry in alignment with the longitudinal axis of said cylindrical member, an antenna located at the focus of said parabolic reflector, means for rotating said cylindrical member while maintaining the inclined end thereof in contact with the truncated portion of said V-shaped member whereby the electromagnetic energy radiated from said antenna and focused into a beam by said parabolic reflector scans a hollow conical area in space, and means for concurrently rotating said V-shaped member about the longitudinal axis of said first leg whereby said energy scans a solid cone in space, the altitude of which is co-extensive with the longitudinal axis of said first leg and the apex angle of which is four times said acute angle.

12. In an arrangement as described in claim 11 means for generating voltages proportional to the sine and cosine, respectively, of the angle of rotation of said cylindrical member, means for generating voltages proportional respectively to the sine and cosines of the angle of rotation of said V-shaped member, means for adding said sine voltages and for adding said cosine voltages, a cathode ray tube, means for applying said added sine and cosine voltages to the horizontal and vertical deflecting plates, respectively, of said cathode ray tube whereby the electron beam of said tube is deflected to a position on the face of said tube which is representative of the instantaneous position of said beam of electromagnetic energy.

13. In an arrangement as defined in claim 11, first and second circular potentiometers, means for applying equal voltages to diametrically opposite points of each of said potentiometers, means for rotating the movable arms of said first circular potentiometer in synchronism with the rotation of said cylindrical member, means for moving the movable arms of said second circular potentiometer in synchronism with the rotation of said V-shaped member whereby voltages proportional to the sine and cosine, respectively, of the angle of rotation of said cylindrical member and said V-shaped member are generated, means for combining said sine voltages, means for combining said cosine voltages, a cathode ray tube, means for coupling said added sine voltages to one pair of deflecting plates of said cathode ray tube, and means for applying cosine voltages to the other pair of deflecting plates whereby the electron beam of said tube is deflected in accordance with the movement of said beam of electromagnetic energy.

References Cited in the file of this patent

UNITED STATES PATENTS

| 2,406,358 | Doba | Aug. 27, 1946 |
| 2,410,666 | Leak | Nov. 5, 1946 |
| 2,416,591 | Muntz et al. | Feb. 25, 1947 |
| 2,473,175 | Ridenour | June 14, 1949 |
| 2,495,753 | Mozley | Jan. 31, 1950 |
| 2,512,139 | Cady | June 20, 1950 |
| 2,531,466 | Ranger | Nov. 28, 1950 |
| 2,537,822 | Fritts | Jan. 9, 1951 |
| 2,554,119 | Perham | May 22, 1951 |